(12) United States Patent
Pelster et al.

(10) Patent No.: US 12,504,913 B2
(45) Date of Patent: Dec. 23, 2025

(54) METHODS AND SYSTEMS TO DYNAMICALLY IMPROVE LOW TASK STORAGE DEPTH LATENCY IN A SOLID-STATE DRIVE DEVICE

(71) Applicant: SK Hynix NAND Product Solutions Corp., San Jose, CA (US)

(72) Inventors: David J. Pelster, Longmont, CO (US); Donia Sebastian, Fair Oaks, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 17/948,599

(22) Filed: Sep. 20, 2022

(65) Prior Publication Data

US 2024/0094939 A1     Mar. 21, 2024

(51) Int. Cl.
*G06F 3/06*     (2006.01)
(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 11,079,822 B2* | 8/2021 | Hatch | G06F 3/0653 |
| 2018/0356996 A1* | 12/2018 | Benisty | G06F 3/0653 |
| 2020/0409441 A1* | 12/2020 | Hatch | G06F 1/3268 |
| 2021/0081016 A1 | 3/2021 | Hovis et al. | |

* cited by examiner

*Primary Examiner* — Kevin Verbrugge
(74) *Attorney, Agent, or Firm* — Haley Guiliano LLP

(57) ABSTRACT

Systems and methods are provided for dynamically changing the operating clock frequency of a circuit. Control circuitry determines a first workload value for a circuit operating at a first clock frequency. Control circuitry then detect a second workload value for the circuit, which is less than the first workload value. When the control circuitry detects the second workload value, the control circuitry calculates a second clock frequency which is greater than the first clock frequency. The control circuitry then causes the circuit to operate at the second clock frequency.

19 Claims, 5 Drawing Sheets

METHODS AND SYSTEMS TO DYNAMICALLY IMPROVE LOW TASK STORAGE DEPTH LATENCY IN A SOLID-STATE DRIVE DEVICE

TECHNICAL FIELD

The present disclosure is related to storage device systems and methods for dynamically changing the operating clock frequency of a circuit, and more specifically to determining an operating clock frequency based on a low queue workload in the circuit.

SUMMARY

In accordance with the present disclosure, systems and methods are provided to improve operational qualities of a circuit (e.g., improve latency of the circuit when workload of a task storage for the circuit is low). In some embodiments, a circuit (e.g., of a hardware accelerator of a storage device) has at least one pipelined processor with a task storage of commands for execution by the at least one processor. In some embodiments, the circuit may be any other suitable circuit.

In some embodiments the methods may include determining, by using a control circuitry, a first workload value for a circuit operating at a first clock frequency. The method further includes using the control circuitry to detect a second workload value for the circuit, which is less than the first workload value. When the control circuitry detects the second workload value, the control circuitry calculates a second clock frequency which is greater than the first clock frequency. The control circuitry then causes the circuit to operate at the second clock frequency.

In some embodiments the control circuitry also determines a third workload value for the circuit operating at a third clock frequency. The control circuitry further detects a fourth workload value, which is greater than the third workload value. In this instance, in response to the control circuitry detecting a fourth workload value that is greater than the third workload value, the control circuitry calculates a fourth clock frequency that is less than the third clock frequency. When the fourth clock frequency is calculated, the control circuitry causes the circuit to operate at the fourth clock frequency. In some embodiments, the circuit may be a solid-state drive (SSD) pipelined accelerator or a network controller pipelined hardware accelerator.

In some embodiments, the first and second workload values are measured by the number of instructions scheduled for execution by the circuit. In some embodiments, the workload values are measured by the number of commands scheduled for execution by the circuit. In some embodiments, the instructions or commands are stored in a task storage, which is communicatively coupled to the circuit. In some embodiments, the instructions or commands may be stored in a task storage (e.g., a buffer, a stack, a queue) before being executed by the circuit.

In some embodiments, the control circuitry may calculate the second clock frequency by using a linear function. For example, the linear function may be a relationship between the operating clock frequency of the circuit and the workload value. In some embodiments, using a linear function for calculating the second clock frequency is further based on a minimum operational clock frequency of the circuit, a maximum operational clock frequency of the circuit, and a ratio of the second workload value to a maximum workload capacity of the task storage. In some embodiments, calculating the second clock frequency includes comparing the second workload value to a reference workload value. If the control circuitry determines that the second workload value is less than the reference workload value, the control circuitry causes the circuit to operate at a third clock frequency. If the control circuitry determines that the second workload value is greater than the reference workload value, the control circuitry causes the circuit to operate at a fourth clock frequency, which is lower than the third clock frequency. In some embodiments, calculating the second clock frequency includes determining a range from a plurality of ranges of workload values that corresponds with the second workload value. In this embodiment, each range of the plurality of ranges of workload values corresponds to a respective clock frequency. When the range of workload values is determined, the control circuitry selects a clock frequency to be the second clock frequency.

In some embodiments, the control circuitry causes the circuit to operate at the second clock frequency by coupling the circuit to a voltage rail out of many voltage rails based on the second clock frequency. In some embodiments, causing the circuit to operate at the second clock frequency includes using a power management integrated circuit (PMIC), coupled to the circuit, to change the voltage of the circuit.

In some embodiments, a solid-state drive (SSD) storage system is provided having an SSD pipelined accelerator, and a storage controller communicatively coupled to the SSD pipelined accelerator. In some embodiments, the storage controller is configured to determine a first workload value for a circuit operating at a first clock frequency and detecting a second workload value for the circuit, less than the first workload value. If the storage controller detects the second workload value for the circuit, the storage controller calculates a second clock frequency for the circuit, which is greater than the first clock frequency and causes the circuit to operate at the second clock frequency.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
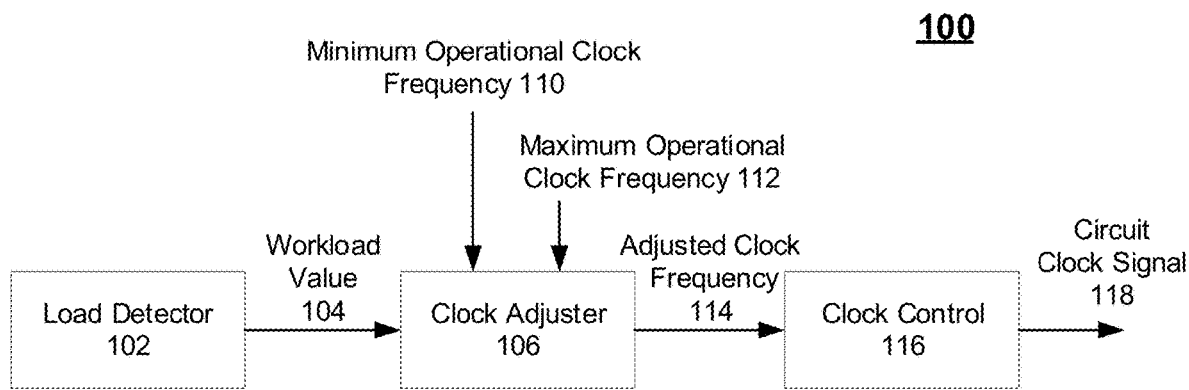
FIG. 1 shows an illustrative diagram of a control circuitry for dynamically changing the circuit clock control based on a workload value, in accordance with some embodiments of the present disclosure.

In accordance with the present disclosure, systems and methods are provided to improve the operational quality of a circuit (e.g., improve latency when the instruction task storage has a low number of commands). In some embodiments, the task storage may be an instruction buffer, an instruction stack or an instruction queue for the circuit. A circuit (e.g., a hardware accelerator of a storage device or a network device) may have a pipelined processor with a task storage of commands for execution by at least one processor. In some embodiments, a pipelined processor may operate on multiple instructions from the task storage concurrently, e.g., by splitting up each processor core into stages (e.g., based on a role and available resources). For example, each processor core may be split up into four stages: fetch, decode, execute, write-back. Each of these stages may operate at one operation or more of an instruction per clock cycle in parallel. However, in general, for each instruction, the operations must still run sequentially with regard to clock cycles. The decode operation of an instruction cannot necessarily start before the fetch operation of the instruction is complete. Therefore, the pipelined processor of this embodiment is able to execute on 4 different instructions during a single clock cycle. In some alternate embodiments, the pipeline may have more stages or more complex systems or features to reorder, prioritize, or predict the outcome of certain instructions that are buffered for execution. A pipelined processor may also start processing a next command before a previous command is done working though the stages.

In one approach, when the task storage of commands or instructions has a low number of commands (e.g., below a certain percentage of total task storage size), the pipelined processor may execute the commands or instructions while operating at a normal or reduced frequency (e.g., at the same or lower frequency when there is a larger number of commands in the task storage). However, in this approach the latency of the circuit increases because there are not enough commands or instructions to fill up the pipeline.

To solve this problem, operation of the circuit may be adjusted to increase the frequency of the circuit when the number of commands or instructions in the task storage decreases. In this way, the latency of the circuit is lowered in the situation when the number of commands or instructions in the task storage is low.

In some embodiments, the pipelined processor may be a highly parallelized processor capable of handling high bandwidths of instructions quickly (e.g., by starting simultaneous processing of new instructions before completion of previous instructions). In one example, multiple instances of tasks may be completed in parallel, such that each task of the same type will have the same latency. That is, by leveraging parallelism, such a processor can get process tasks at higher rates if it is given more tasks. However, when the task storage is low on tasks (e.g., commands or instructions) the parallelized pipelined processor may be incapable of fully taking advantage of such parallel processing (e.g., because there may be not enough new commands to begin processing while previous commands are being processed). As explained above and below, when such a situation occurs, frequency of the processor may be increased to decrease latency of task execution to alleviate the lack of parallelization.

In some embodiments the system and methods of the present disclosure may refer to a solid-state drive (SSD) storage system, which includes an SSD pipelined accelerator and a storage controller or a pipelined processor and network controller for transport layer protocols (e.g., PCIe).

A solid-state drive (SSD) is a data storage device that uses integrated circuit assemblies as memory to store data persistently. SSDs have no moving mechanical components, and this feature distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and include a type of non-volatile storage technology. Quality of Service (QoS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-5.

FIG. 1 shows an illustrative diagram of a control circuitry 100 for dynamically changing the circuit clock by way of a circuit clock control 116 for a circuit (e.g., hardware accelerator of an SSD drive or a network card) based on a workload value 104 of the circuit.

In some embodiments, the control circuitry 100 includes a load detector 102 which determines a workload value 104 of a task storage of commands or instructions of the circuit. In some embodiments, the task storage may be an instruction buffer, an instruction stack or an instruction queue for the circuit. For example, a circuit (e.g., a solid-state drive) has a processor and a task storage of instructions to be executed by the processor. In this example, the control circuitry 100 may be located within the storage device or may be located outside of the storage device. The load detector 102 receives task storage information from the task storage, and outputs a workload value 104. In some embodiments, the workload value 104 is used by a clock adjuster 106, which determines an adjusted clock frequency 114 for the storage device. In some embodiments, the adjusted clock frequency 114 is also based on a minimum operational clock frequency 110 and a maximum operational clock frequency 112 for the circuit, which may be set as circuit-specific or adjustable variable that may be requested by the control circuitry 100 for the clock adjuster 106. In some embodiments, the adjusted clock frequency 114 is received by the clock control 116, which selects a circuit to which the new circuit clock signal 118 is set to the adjusted clock frequency 114. In some embodiments, when the control circuitry 100 provides dynamic clock frequency changes to multiple circuits, the clock control 116 may use select bits to determine to which circuit clock signal to send the new circuit clock signal.

Any of the load detector 102, clock adjuster 106, and clock control 116 may include a processor and memory. In some embodiments, the processor of any of the load detector 102, clock adjuster 106, and the clock control 116 may include a hardware processor, a software processor, or any combination thereof. In some embodiments, any of the load detector 102, clock adjuster 106, and the clock control 116 may be hardwired circuits, software modules (e.g., logical blocks) that emulate hardware, or a combination thereof. In some embodiments, the control circuitry 100 may include a single software processor (e.g., a processor emulated using a virtual machine). Each processor may include a hardware processor, a software processor, or any combination thereof. In some embodiments, the processor and memory in combination may be referred to as control circuitry 100. In some embodiments, the processor alone may be referred to as control circuitry 100. The memory of the control circuitry 100 may include hardware elements for non-transitory storage of commands or instructions, a history of workload values 104, and a minimum operational clock frequency 110 and a maximum operational clock frequency 112.

In some embodiments, the control circuitry 100 may dynamically change the clock frequencies of multiple circuits, wherein each respective circuit has a task storage and a processor running at a respective clock frequency. For example, if the workload value decreases, the load detector 102 detects the decrease and determines the smaller workload value 104 that is sent to the clock adjuster 106. The clock adjuster 106 then determines the adjusted clock frequency 114 based on the workload value 104, the minimum operational circuit clock frequency 110 and the maximum operational circuit clock frequency 112. The adjusted clock frequency 114 is then sent to the clock control 116, which sets the clock signal 118 frequency of the circuit to the adjusted clock frequency 114. The adjusted clock frequency 114 may be determined by using techniques and relationships shown in one or more of graphs 300, 310, or 320 of FIG. 3A, FIG. 3B, and FIG. 3B, respectively.

Figure 2:
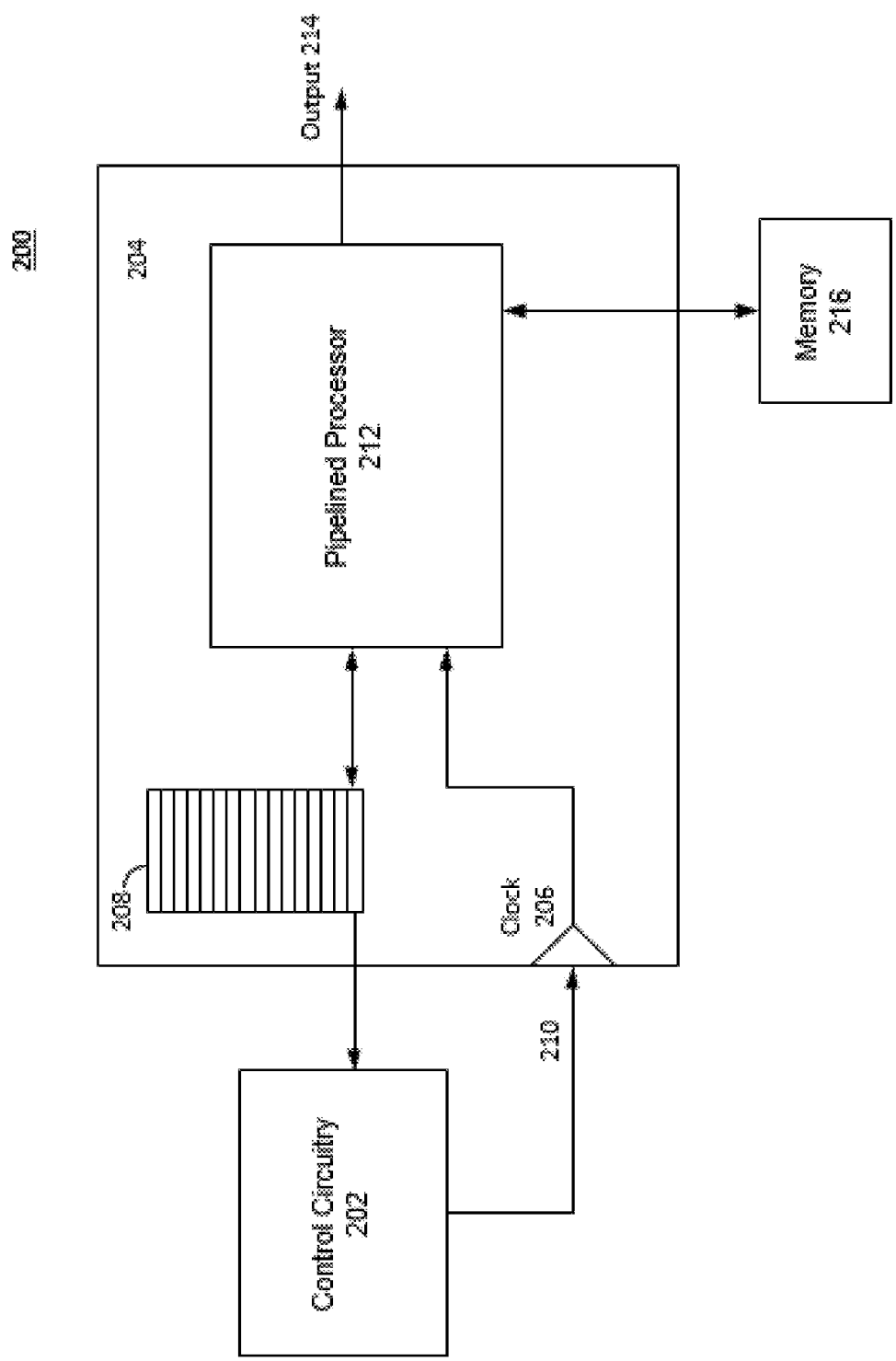
FIG. 2 shows an illustrative diagram of a system for dynamically changing the clock frequency of a circuit in accordance with some embodiments of the present disclosure.

FIG. 2 shows an illustrative diagram of a system for dynamically changing the clock frequency of a circuit in accordance with some embodiments of the present disclosure. FIG. 2 shows an illustrative diagram of a system 200 for dynamically changing the operating frequency of a pipelined processor 212 (e.g., processor of an SSD drive or network card), in accordance with some embodiments of the present disclosure. In some embodiments, the system 200 includes a control circuitry 202, which determines and sets a new circuit clock frequency 210 for the circuit 204. In some embodiments, the control circuitry 202 may be the same control circuitry 100 shown in FIG. 1. In some embodiments, control circuitry 202 may execute the functions of load detector 102, clock adjuster 106, and/or clock adjuster 116 through software, hardware, or a combination thereof. The circuit 204 includes a circuit clock input 206, a task storage 208 for temporarily storing commands or instructions, and a pipelined processor 212. In some embodiments, the task storage 208 may be an instruction buffer, an instruction stack or an instruction queue for the circuit 204. In some embodiments, the circuit 204 may include a memory 216, which may be located inside or outside of the circuit 204. In some embodiments, the pipelined processor 212 is communicatively coupled to the task storage 208 (e.g., a buffer, a stack, or a queue), a clock signal 206, and a memory 216. Additionally, the pipelined processor 212 is communicatively coupled to a circuit output 214. In some embodiments, the pipelined processor 212 may write to or read from the task storage 208, which temporarily stores commands or instructions scheduled to be executed. The capacity of the task storage 208 is defined by the maximum number of commands or instructions that may be stored within the task storage 208. Generally, the task storage size refers to the number of commands or instructions currently stored in the task storage 208. In some embodiments, status data of task storage 208 (e.g., task storage size and task storage capacity) is received by the control circuitry 202 in order to determine an adjusted operational clock frequency 210, to be set as the new clock signal 206 of the circuit 204. For example, the control circuitry 202 determines a workload value for a circuit 204 operating at a first clock frequency. The first workload value is determined by receiving task storage size data from the task storage 208 of the circuit 204. The load detector of the control circuitry 202 determines the first workload value while the circuit 204 is operating at a first clock frequency. When the first workload value is determined, the control circuitry 202 determines whether there is a change in the workload value. In some embodiments, there may be a plurality of circuits electrically coupled to the control circuitry 202. In these embodiments, the control circuitry 202 may be executing, in parallel, multiple determinations and outputting new clock signals for multiple circuits of the plurality of circuits.

In some embodiments, the control circuitry 202 determines the adjusted operational clock frequency 210 by an equation or formula. For example, the control circuitry 202 may use the following equation to calculate the adjusted operational frequency f:

$$f[h](q) = M[h] + q\left(\frac{N[h] - M[h]}{Q}\right)$$

wherein q is the workload value, Q is the maximum load or the task storage 208 capacity, M[h] is the maximum clock frequency of circuit h, and N[h] is the minimum clock frequency of circuit h. In some embodiments, the workload value q corresponds to the task storage size of task storage 208. In one example, a circuit h has a task storage 208 with 8 kilobytes (KB) of task storage capacity Q, a maximum clock frequency M[h] of 80 megahertz (MHz) and a minimum clock frequency N[h] of 12 MHz. When the workload value q is 4 KB ($q_1$), the control circuitry 202 sets the operational frequency f[h]($q_1$) for circuit h at workload value $q_1$ to 46 MHz. If the control circuitry 202 detects an increase in the workload value q to 7 KB ($q_2$), the control circuitry 202 determines that the adjusted operational frequency f[h]($q_2$) for circuit h at workload value $q_2$ is 20.5 MHz. In some embodiments, the control circuitry 202 sets the clock frequency of the circuit to the adjusted clock operational frequency f[h]($q_2$).

For example, the same equation seen in the previous paragraph may be used to calculate the adjusted operational frequency of a circuit that has an internal circuit latency of 12 microseconds. The internal circuit latency is the time taken by the circuit to process an instruction. Additionally (e.g., for a read instruction), extra latency from worst-case latency of 50 microseconds may exit due to the need to access a memory device (e.g., to read 4 KB of data). Therefore, in this example, the approximate total worst-case latency for the read command for 4 KB of read data is about 62 microseconds(12 us+50 us). Consequently, in this example, the maximum frequency for the clock signal is about 16.1 kilohertz (1/62 us) in order to process an instruction with worst-case latency. In this example, the control circuitry 202 determines a first workload value of 4 KB read commands in the task storage for a circuit operating at a first clock frequency (lower than a maximum frequency of 16.1 kilohertz). If the control circuitry 202 determines that the number of 4 KB read commands in the task storage of the circuit decreases to a second workload value, the control circuitry 202 then calculates a second clock frequency, which is greater than the first clock frequency but less than the maximum frequency (e.g., maximum frequency of 16.1 kilohertz). The control circuitry 202 then causes the circuit to operate at the second clock frequency.

The control circuitry 202 is configured to increase the clock frequency of the circuit as the workload value decreases and decrease the clock frequency of the circuit when the workload value increases. The circuit 204 has a worst-case latency, that includes network latency between components, task storage 208 read latency, memory read latency and processor 212 latency. In some embodiments the worst-case latency will correspond with the minimum operational circuit clock frequency. This minimum operational circuit clock frequency ensures a minimum throughput, even at a high workload value. When the workload value decreases, the clock frequency may increase in order to achieve a higher throughput while the workload value continues to decrease.

Figure 3A:
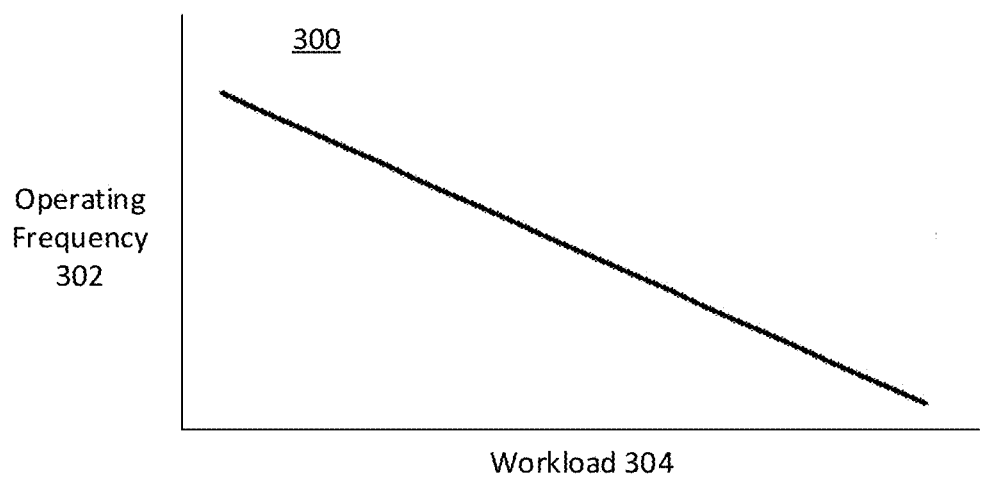
FIG. 3A shows an illustrative graph providing an exemplary relationship between the workload value and the operating frequency, in accordance with some embodiments of the present disclosure.
Figure 3B:
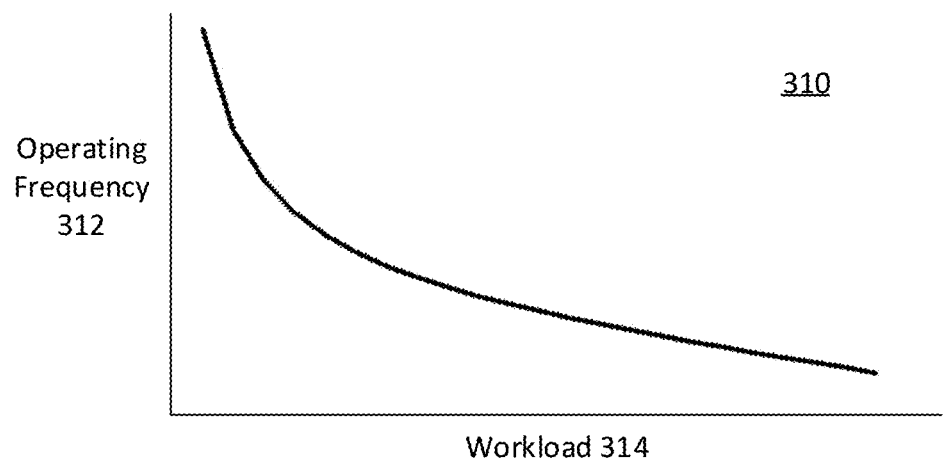
FIG. 3B shows an alternate illustrative graph providing another exemplary relationship between the workload value and the operating frequency, in accordance with some embodiments of the present disclosure.
Figure 3C:
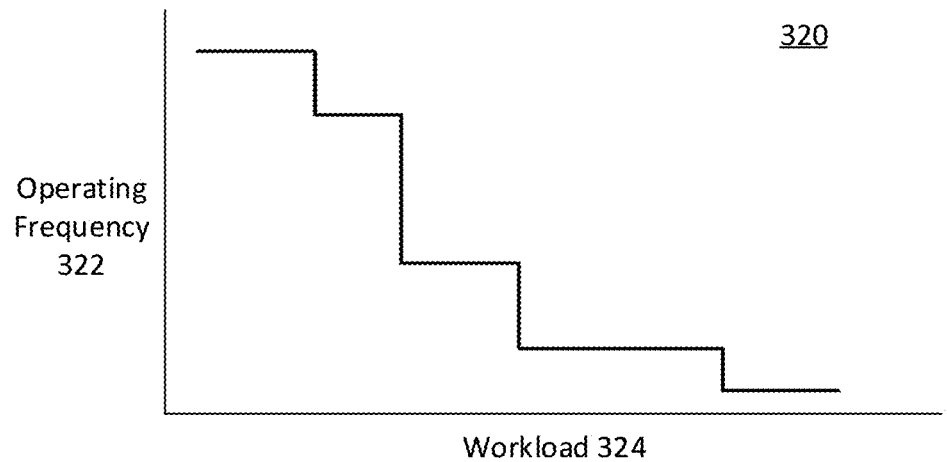
FIG. 3C shows another illustrative graph providing another exemplary relationship between the workload value and the operating frequency, in accordance with some embodiments of the present disclosure.

FIGS. 3A, 3B and 3C show illustrative graphs 300, 310, and 320, providing different relationships between the workload value and the operating frequency, in accordance with some embodiments of the present disclosure. For each graph 300, 310, and 320, the workload independent variable 304, 314, and 324 may also be referred to as the workload value 104 from FIG. 1. In some embodiments, the control circuitry (e.g., control circuitry 202) may use the formulas or relationships that are illustrated by graphs 300, 310, 320 for determining the operating clock frequency 302, 312, 322 based on the workload values 304, 314, 324 of the task storage (e.g., task storage 208). In some embodiments, the task storage may be an instruction buffer, an instruction stack or an instruction queue for the circuit. In some embodiments, the workload value is the task storage size, or how many commands or instructions are currently stored in the task storage. In some embodiments, the workload value is a percentage of the task storage memory that contains stored commands or instructions. The operating frequency 302, 312, and 322, refers to the operating clock frequency that is set as the new clock signal of a circuit (e.g., circuit 204). In FIG. 3A, the graph 300 illustrates a linear, inverse relationship between the workload 304 and the operating frequency 302. For example, the operating frequency 302 may be inversely proportional to a ratio of the task storage workload 304 to the task storage capacity. In this example, as the task storage stores more commands and instructions, the workload 304 increase, the task storage capacity remains constant and therefore the ratio increases. For example, graph 300 may be a portion of a linear relationship between operating frequency (f) 302 and workload value (q) 304 of a circuit such as:

$$f(q) = 15 \times 10^3 - \frac{1}{2}q$$

wherein the size of the task storage 208, for example, may range from 256B to 8 KB, and therefore are the lower and upper bounds for the portion of the linear relationship that is used for this circuit. For example, the control circuitry determines that at a first workload value (e.g., current task storage size) $q_1$ of 5 KB, the first clock frequency $f(q_1)$ is 12.5 kHz. If the control circuitry determines a decrease to a second workload value $q_2$ of 2 KB, the control circuitry determines that the second clock frequency $f(q_2)$ is 14 kHz and causes the circuit to operate at the second clock frequency. By increasing the clock frequency from 12.5 kHz to 14 kHz, the processor in the circuit executes a larger number of instructions in a same amount of time. While this linear relationship is shown in FIG. 3A for the control circuitry, control circuitry may use any other suitable decreasing linear function (e.g., a linear function with a negative slope) with to calculate the adjusted operating frequency.

FIG. 3B shows a graph 310 with an alternate relationship, wherein the change in operating frequency 312 becomes smaller for every increment increase in task storage workload 314. In addition, when the task storage workload 314 reaches a certain value, the relationship begins to become more linear. While this hyperbolic relationship is shown in FIG. 3B for the control circuitry, control circuitry may use any other suitable decreasing hyperbolic function (e.g., a hyperbolic function with a decreasing negative slope) with to calculate the adjusted operating frequency.

FIG. 3C illustrates a graph 320, in which the operating frequency 322 determined by the control circuitry is determined by a step function of the task storage workload 324. There are ranges of workload 324 values that correspond to a single operating frequency 322. In this graphical example 320, there are five different workload 324 ranges shown with five corresponding operating frequencies 322. For example, a circuit with an 8 KB capacity task storage may have the control circuitry of the circuit determine the operating frequency 322 of the circuit as shown in graph 320. For a workload value 324 range 256B to 1 KB the operating frequency 322 is 80 MHz. Workload value 324 ranges of 1 KB to 3 KB and 3 KB to 5 KB, the corresponding operating frequencies 322 are 70 MHz and 55 MHz, respectively. Lastly, the workload value 324 ranges of 5 KB to 7.5 KB and 7.5 KB to 8 KB correspond to operating frequencies 322 40 MHz and 32 MHz, respectively. The steps in operating frequency 322 may be determined by the control circuitry as the most efficient operating frequency 322 for the given range of workload values 324 without frequently changing the operating frequency 322. While this step function is shown in FIG. 3C for the control circuitry, control circuitry may use any other suitable decreasing step function to calculate the adjusted operating frequency.

In some embodiments, portions of each of these graphs may be used over certain ranges of workload 304, 314, 324 values. For example, within a first range of workload values, the relationship between the task storage workload and the operating frequency is linear, however in a second range of workload values the relationship between the task storage workload and the operating frequency is hyperbolic. This example shows the number of relationship configurations for workload 304, 314, and 324, and operating frequency 302, 312, 322 that may be used for the circuit. In some embodiments, the operating frequencies 302, 312, 322 may increase if the workload value is at the task storage capacity and requires a greater frequency to avoid a bottleneck in the throughput. Additionally, for each circuit, there is a maximum operational circuit frequency and a minimum operational circuit frequency, which may be seen as the endpoints of each relationship of the graphs 300, 310, and 320.

Figure 4:
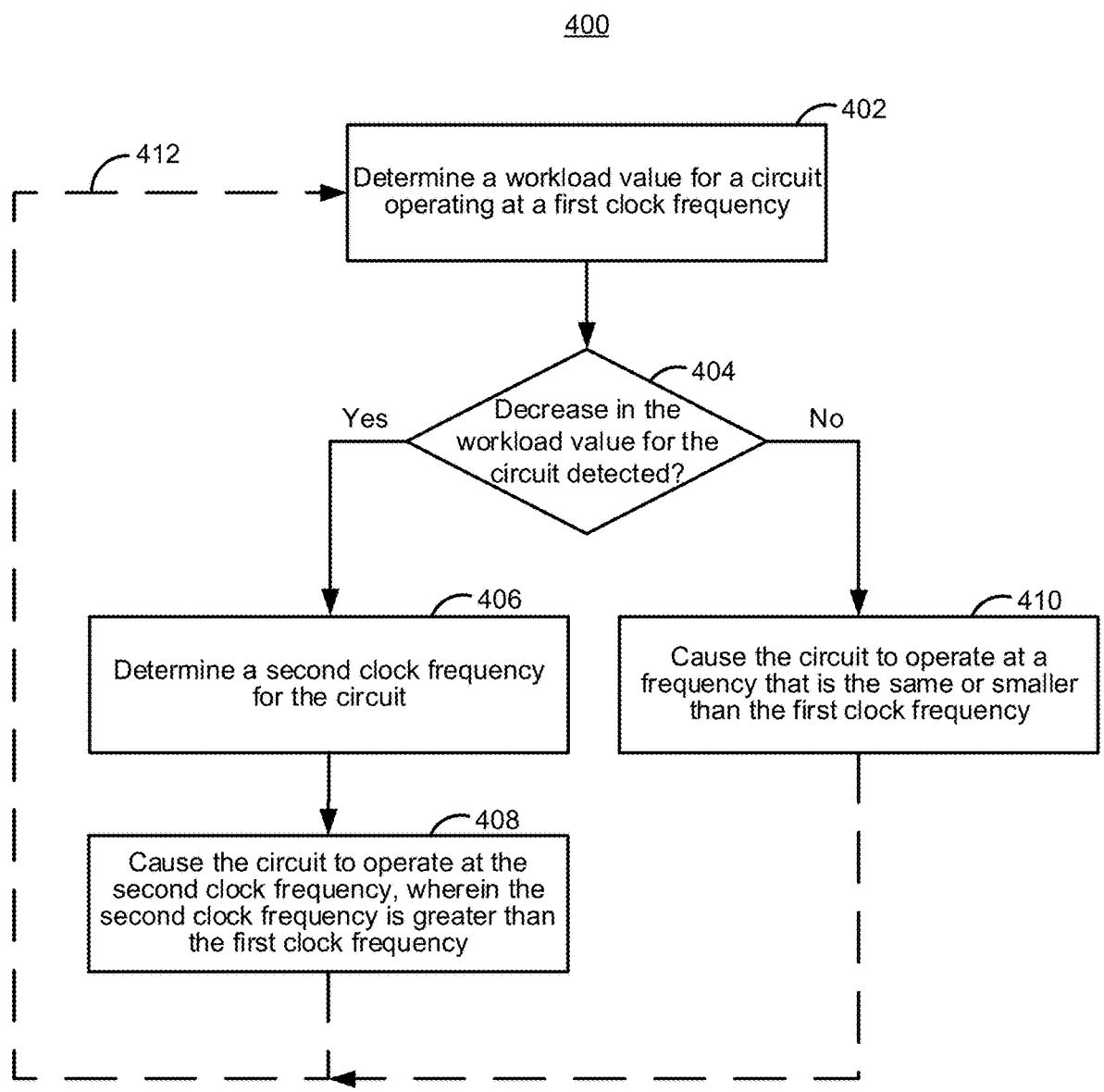
FIG. 4 illustrates a flowchart for determining and setting a clock frequency based on a workload value, in accordance with some embodiments of this disclosure.

FIG. 4 illustrates a flowchart 400 for determining and setting a clock frequency based on a workload value, in accordance with some embodiments of this disclosure. The flowchart illustrates a method that is executed by a control circuitry, which may be the same control circuitry 202 seen in FIG. 2. In some embodiments, the steps described in flowchart 400 can be modified by, for example, having steps rearranged, changed, added, and/or removed.

At step 402, the control circuitry (e.g., control circuitry 202 of FIG. 2) determines a workload value for a circuit operating at a first clock frequency. The first workload value is determined by receiving task storage size data from the task storage (e.g., task storage 208 of FIG. 2) of the circuit (e.g., circuit 204 of FIG. 2). In some embodiments, the task storage may be an instruction buffer, an instruction stack or an instruction queue for the circuit. The load detector of the control circuitry determines the first workload value while the circuit is operating at a first clock frequency. When the first workload value is determined, the control circuitry determines whether there is a change in the workload value.

At step 404, the control circuitry determines whether the load detector detects a decrease in the workload value for the circuit. After determining the first workload value, the load detector detects if the task storage size has decreased to a second workload value since the determination of the first workload value. If the control circuitry detects a decrease in workload value, the control circuitry determines a second clock frequency, at step 406. However, if a decrease in the workload value is not detected, the control circuitry causes the circuit to operate at a clock frequency that is the same or smaller than the first clock frequency, at step 410.

At step 406, the control circuitry determines a second clock frequency for the circuit. The control circuitry determines a second clock frequency based on the second workload value. The clock adjuster of the control circuitry determines the second clock frequency (e.g., an adjusted clock frequency 114 seen in FIG. 1) by using a configured relationship between the operating clock frequency of the circuit and the workload value of the task storage 208. As previously mentioned, the relationship between the operating clock frequency of the circuit and the workload value of the circuit task storage 208 may be a linear relationship, a hyperbolic relationship, based on a step function, or any other suitable relationship. In some embodiments, the relationship between the operating clock frequency of the circuit and the workload value of the task storage may vary. For example, within a first range of workload values, the relationship between the task storage workload and the operating frequency is one relationship, and within a second range of workload values, the relationship between the task storage workload and the operating frequency is another relationship, and so on.

At step 408, the control circuitry causes the circuit to operate at the second clock frequency, wherein the second clock frequency is greater than the first clock frequency. The clock control of the control circuitry sets the second clock frequency as the new clock signal of the circuit. As previously discussed, the workload value decreased, therefore the second clock frequency is greater than the first clock frequency in order to execute a fewer number of commands or instructions in a short burst of time, which may result in lowering the latency (e.g., to increase the number of executed commands or instructions), for example, by taking advantage of available circuit power budget. Additionally, when the control circuitry sets the new clock signal frequency, the control circuitry should then follow this closed loop method 400 by determining a new workload value for the circuit at a new first clock frequency, wherein the new first clock frequency is the previous second clock frequency. In some embodiments, the control circuitry causing the circuit to operate at the second clock frequency includes coupling the circuit to a voltage rail of a plurality of voltage rails selected based on the second clock frequency. In some embodiments, each voltage rail of the plurality of voltage rails correspond to a different clock frequency. In some embodiments, coupling the circuit to a voltage rail may include causing current to travel from the selected voltage rail through the circuit. In some embodiments, the control circuitry may cause the circuit to operate at the second clock frequency by using a power management integrated circuit (PMIC), coupled to the circuit, to change a voltage of the circuit. In some embodiments, the PMIC uses adaptive voltage scaling (AVS), which gradually steps the voltage up or down without greatly affecting the performance of the circuit. Generally, as the voltage increase, the clock frequency also increases, and conversely if the voltage decreases, the clock frequency decreases.

At step 410, the control circuitry causes the circuit to operate at a clock frequency that is the same or smaller than the first clock frequency. In some embodiments, the second workload value is the same as the first workload value, therefore the control circuitry maintains the circuit clock frequency to be the same. However, as described in more detail in the description of FIG. 5 below, when the workload value increases, the control circuitry causes the circuit to operate at a clock frequency that is less than the first clock frequency. Additionally, when the control circuitry causes the circuit to operate at the new clock signal frequency, the control circuitry should then follow this closed loop method 400 by determining a new workload value for the circuit at a new first clock frequency.

Figure 5:
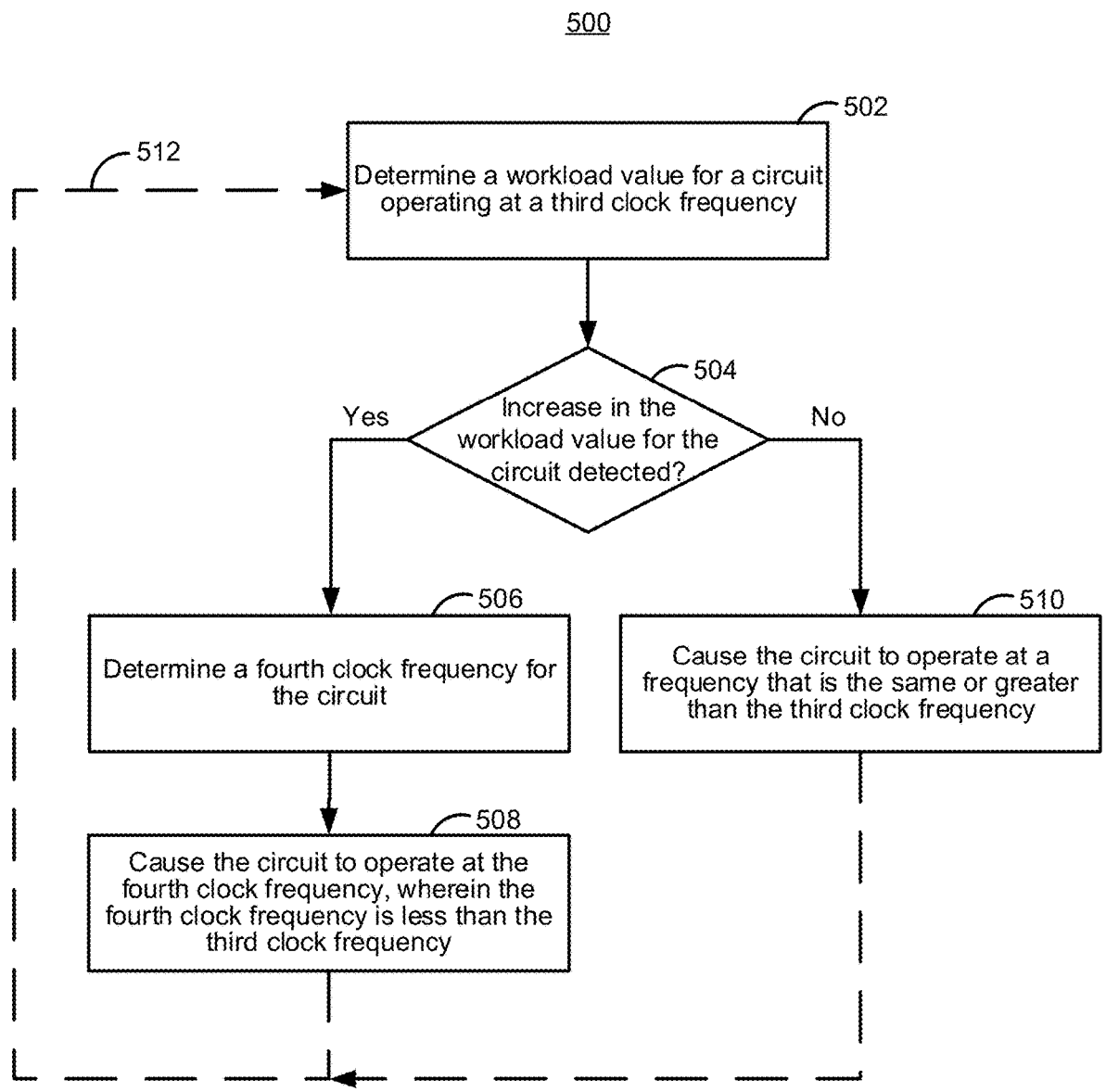
FIG. 5 shows another flowchart for determining and setting a clock frequency based on a workload value, in accordance with some embodiments of the present disclosure.

FIG. 5 shows another flowchart for determining and setting a clock frequency based on a workload value, in accordance with some embodiments of the present disclosure. The flowchart 500 illustrates a method that is executed by a control circuitry, which may be the same control circuitry 202 seen in FIG. 2. In some embodiments, the steps described in flowchart 500 can be modified by, for example, having steps rearranged, changed, added, and/or removed.

At step 502, the control circuitry determines a workload value for a circuit operating at a third clock frequency. The third workload value is determined by receiving task storage size data from the task storage (e.g., task storage 208) of the circuit (e.g., circuit 204). In some embodiments, the task storage may be an instruction buffer, an instruction stack or an instruction queue for the circuit. The load detector of the control circuitry determines the third workload value while the circuit is operating at a third clock frequency. When the third workload value is determined, the control circuitry determines whether there is a change in the workload value.

At step 504, the control circuitry determines whether an increase in the workload value for the circuit is detected. After determining the third workload value, the load detector detects if the task storage size has increased to a fourth workload value since the determination of the third workload value. If the control circuitry detects an increase in workload value, the control circuitry determines a fourth clock frequency, at step 506. However, if an increase in the workload value is not detected, the control circuitry causes the circuit to operate at a clock frequency that is the same or greater than the third clock frequency, at step 510

At step 506, the control circuitry determines a fourth clock frequency for the circuit. The control circuitry determines a fourth clock frequency based on the fourth workload value. The clock adjuster of the control circuitry determines the fourth clock frequency (e.g., an adjusted clock frequency 114 seen in FIG. 1) by using a configured relationship between the operating clock frequency of the circuit and the workload value of the task storage. As previously mentioned, the relationship between the operating clock frequency of the circuit and the workload value of the task storage may be a linear relationship, a hyperbolic relationship, based on a step function, or any other suitable relationship. In some embodiments, the relationship between the operating clock frequency of the circuit and the workload value of the task storage may vary. For example, within a first range of workload values, the relationship between the task storage workload and the operating frequency is one relationship, and within a second range of workload values, the relationship between the task storage workload and the operating frequency is another relationship, and so on.

At step 508, the control circuitry causes the circuit to operate at the fourth clock frequency, wherein the fourth clock frequency is less than the third clock frequency. The clock control of the control circuitry sets the fourth clock frequency as the new clock signal of the circuit. As previously discussed, the workload value increase, therefore the fourth clock frequency is less than the third clock frequency in order to execute a greater number of commands or instructions with less circuit power consumption while maintaining at least a minimum operational circuit clock frequency, which may result in circuit power consumption efficiency. Additionally, when the control circuitry sets the new clock signal frequency, the control circuitry should then follow this closed loop method 500 by determining a new workload value for the circuit at a new third clock frequency, wherein the new third clock frequency is the previous fourth clock frequency At step 510, the control circuitry causes the circuit to operate at a clock frequency that is the same or greater than the third clock frequency. In some embodiments, the fourth workload value is the same as the third workload value, therefore the control circuitry maintains the circuit clock frequency to be the same. However, when the workload value decreases, as seen in method 400, the control circuitry causes the circuit to operate at a clock frequency that is greater than the third clock frequency. Additionally, when the control circuitry causes the circuit to operate at the new clock signal frequency, the control circuitry should then follow this closed loop method 500 by determining a new workload value for the circuit at a new third clock frequency While the description of FIG. 5 refers to third and fourth clock frequencies, it should be noted that for the operation of the circuit, the third and fourth clock frequencies do not have to temporally follow the first and second clock frequencies referenced in FIG. 4. In one embodiment, the circuit operation follows the method 400 of FIG. 4, in which case the circuit first operates at the first clock frequency then at the second clock frequency, then sometime later at the third clock frequency, and lastly at the fourth clock frequency, (in one example, second and third clock frequencies may be the same). In another embodiment, the method 500 of FIG. 5 is performed independently of method 400 of FIG. 4. In this embodiment the circuit initially operates at the third clock frequency and then the fourth clock frequency. In yet another embodiment, method 500 of FIG. 5 is performed before method 400 of FIG. 4, in this case the circuit first operates at the third clock frequency and then the fourth clock frequency, then at the first and then at the second clock frequencies (e.g., in this example, the fourth and the second clock frequencies may be the same).

In some embodiments for either flowcharts 400 or 500, there may be a plurality of circuits electrically coupled to the control circuitry. In these embodiments, the control circuitry may be executing, in parallel, different steps of this method for a number of the plurality of circuits.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method comprising:
   determining, using control circuitry, a first workload value for a circuit operating at a first clock frequency based on an inverse relationship between all workload values and clock frequencies for the circuit;
   detecting, using the control circuitry, that a workload of the circuit changes to a second workload value for the circuit, less than the first workload value;
   calculating, using the control circuitry, a second clock frequency for the circuit based on the second workload value and on the inverse relationship by calculating the second clock frequency using a linear function for all workload values for the circuit based on the second workload value, wherein using the linear function is based on:
   a minimum operational clock frequency of the circuit;
   a maximum operational clock frequency of the circuit; and
   a ratio of the second workload value to a maximum workload capacity of the circuit; and
   causing, using the control circuitry, the circuit to operate at the second clock frequency.

2. The method of claim 1, wherein the circuit is one of a Solid State Drive (SSD) pipelined hardware accelerator or a network controller pipelined hardware accelerator.

3. The method of claim 1, wherein the first workload value and the second workload value measure a number of instructions scheduled for execution by the circuit.

4. The method of claim 3, wherein the instructions are stored in a task storage communicatively coupled to the circuit.

5. The method of claim 1, wherein the calculating the second clock frequency comprises:
   comparing the second workload value to a reference workload value;
   in response to determining that the second workload value is less than the reference workload value, selecting a third clock frequency as the second clock frequency; and
   in response to determining that the second workload value is greater than the reference workload value, selecting a fourth clock frequency that is lower than the third clock frequency, as the second clock frequency.

6. The method of claim 1, wherein the calculating the second clock frequency comprises:
   determining a range from a plurality of ranges of workload value values to which the second workload value corresponds, wherein each range of the plurality of ranges of workload value values corresponds to a respective clock frequency; and
   selecting a clock frequency corresponding to the determined range as the second clock frequency.

7. The method of claim 1, further comprising:
   determining a third workload value for the circuit operating at a third clock frequency based on the inverse relationship;
   detecting that a workload of the circuit changes to a fourth workload value for the circuit greater than the third workload value;
   calculating a fourth clock frequency for the circuit based on the fourth workload value and on the inverse relationship; and
   causing the circuit to operate at the fourth clock frequency.

8. The method of claim 1, wherein causing the circuit to operate at the second clock frequency comprises coupling the circuit to a voltage rail of a plurality of voltage rails selected based on the second clock frequency.

9. The method of claim 1, wherein causing the circuit to operate at the second clock frequency comprises using a power management integrated circuit (PMIC), coupled to the circuit, to change a voltage of the circuit.

10. A system comprising:
    a circuit; and
    a control circuitry, communicatively coupled to the circuit, the control circuitry to:
    determine a first workload value for a circuit operating at a first clock frequency based on an inverse relationship between all workload values and clock frequencies for the circuit;
    detect that a workload of the circuit changes to a second workload value for the circuit, less than the first workload value;
    calculate a second clock frequency for the circuit based on the second workload value and on the inverse relationship by calculating the second clock frequency using a linear function for all workload values for the circuit based on the second workload value, wherein using the linear function is based on:
    a minimum operational clock frequency of the circuit;
    a maximum operational clock frequency of the circuit; and
    a ratio of the second workload value to a maximum workload capacity of the circuit; and
    cause the circuit to operate at the second clock frequency.

11. The system of claim 10, wherein the first workload value and the second workload value measure a number of instructions scheduled for execution by the circuit.

12. The system of claim 11, wherein the instructions are stored in a task storage communicatively coupled to the circuit.

13. The system of claim 10, wherein the control circuitry further determines the second clock frequency by:
    comparing the second workload value to a reference workload value;
    in response to the determination that the second workload value is less than the reference workload value, cause the circuit to operate at a third clock frequency; and
    in response to the determination that the second workload value is greater than the reference workload value, cause the circuit to operate at a fourth clock frequency that is lower than the third clock frequency.

14. The system of claim 10, wherein the control circuitry is further to determine the second clock frequency by:
    determining a range from a plurality of ranges of workload value values to which the second workload value corresponds, wherein each range of the plurality of ranges of workload value values corresponds to a respective clock frequency; and
    selecting the clock frequency corresponding to the determined range as the second clock frequency.

15. The system of claim 10, wherein the control circuitry is further to cause the circuit to operate at the second clock frequency by coupling the circuit to a voltage rail of a plurality of voltage rails selected based on the second clock frequency.

16. The system of claim 10, wherein the control circuitry is further to cause the circuit to operate at the second clock frequency by using a power management integrated circuit (PMIC), coupled to the circuit, to change a voltage of the circuit.

17. A solid state drive (SSD) storage system comprising:
an SSD pipelined accelerator;
a storage controller, communicatively coupled to the SSD pipelined accelerator, the storage controller to:
determine a first workload value for the SSD pipelined accelerator operating at a first clock frequency based on an inverse relationship between all workload values and clock frequencies for the SSD pipelined accelerator;
detect that a workload of the SSD pipelined accelerator changes to a second workload value for the SSD pipelined accelerator, less than the first workload value;
calculate a second clock frequency for the SSD pipelined accelerator based on the second workload value and on the inverse relationship by calculating the second clock frequency using a linear function for all workload values for the SSD pipelined accelerator based on the second workload value, wherein using the linear function is based on:
a minimum operational clock frequency of the SSD pipelined accelerator;
a maximum operational clock frequency of the SSD pipelined accelerator; and
a ratio of the second workload value to a maximum workload capacity of the SSD pipelined accelerator; and
cause the SSD pipelined accelerator to operate at the second clock frequency.

18. A method, comprising:
determining, using control circuitry, a first workload value for a circuit operating at a first clock frequency based on an inverse relationship between all workload values and clock frequencies for the circuit;
detecting, using the control circuitry, that a workload of the circuit changes to a second workload value for the circuit, less than the first workload value, wherein each of the first workload value and the second workload value is indicative of a respective count of stored instructions in a task storage of the circuit;
calculating, using the control circuitry, a second clock frequency for the circuit based on the second workload value and on the inverse relationship; and
causing, using the control circuitry, the circuit to operate at the second clock frequency.

19. A system, comprising:
a circuit, wherein the circuit comprises a task storage to store instructions; and
a control circuitry, communicatively coupled to the circuit, the control circuitry to:
determine a first workload value for a circuit operating at a first clock frequency based on an inverse relationship between all workload values and clock frequencies for the circuit;
detect that a workload of the circuit changes to a second workload value for the circuit, less than the first workload value, wherein each of the first workload value and the second workload value is indicative of a respective count of stored instructions in the task storage;
calculate a second clock frequency for the circuit based on the second workload value and on the inverse relationship; and
cause the circuit to operate at the second clock frequency.

* * * * *